United States Patent
Wan et al.

(10) Patent No.: US 8,780,934 B2
(45) Date of Patent: Jul. 15, 2014

(54) METHOD FOR PERFORMING SERIAL TRANSPORT COMMUNICATION, AND ASSOCIATED DEVICE

(75) Inventors: Wei-Lun Wan, Hsinchu (TW); Hsien-Chang Liu, Nantou County (TW); Shuo-Jen Hsu, Hsinchu (TW); Chia-Hsuan Chuang, Taitung County (TW); Chih-Hsuan Wang, Hsinchu County (TW); Juei-Ting Sun, Kaohsiung (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 391 days.

(21) Appl. No.: 13/286,221

(22) Filed: Nov. 1, 2011

(65) Prior Publication Data
US 2012/0287772 A1    Nov. 15, 2012

Related U.S. Application Data

(60) Provisional application No. 61/484,445, filed on May 10, 2011.

(51) Int. Cl.
| | |
|---|---|
| H04L 29/06 | (2006.01) |
| H04W 28/04 | (2009.01) |
| H04W 72/04 | (2009.01) |
| H04W 80/04 | (2009.01) |
| H04W 88/06 | (2009.01) |

(52) U.S. Cl.
USPC ............... 370/466; 370/328; 370/329

(58) Field of Classification Search
CPC . H04L 29/06068; H04L 29/06; H04W 28/04; H04W 72/04; H04W 80/04; H04W 88/06
USPC .......................... 370/328, 329, 466
See application file for complete search history.

(56) References Cited

U.S. PATENT DOCUMENTS

| | | | | |
|---|---|---|---|---|
| 2006/0084383 | A1* | 4/2006 | Ibrahim et al. | 455/41.2 |
| 2006/0268965 | A1* | 11/2006 | Ibrahim et al. | 375/149 |

* cited by examiner

*Primary Examiner* — Ronald Abelson
(74) *Attorney, Agent, or Firm* — Winston Hsu; Scott Margo

(57) ABSTRACT

A method for performing serial transport communication is provided, where the method is utilized for performing communication between a plurality of devices, each of which provides a user with a plurality of wireless communication functions respectively complying with different wireless communication standards. The method includes: with regard to a first wireless communication function of the plurality of wireless communication functions, utilizing a serial transport protocol to perform communication between the plurality of devices through a transport bus; and with regard to a second wireless communication function of the plurality of wireless communication functions, utilizing the serial transport protocol to perform communication between the plurality of devices through the transport bus. An associated device is also provided.

13 Claims, 8 Drawing Sheets

METHOD FOR PERFORMING SERIAL TRANSPORT COMMUNICATION, AND ASSOCIATED DEVICE

CROSS REFERENCE TO RELATED APPLICATIONS

This application claims the benefit of U.S. provisional application No. 61/484,445, which was filed on May 10, 2011 and is entitled "Serial Transport Protocol".

BACKGROUND

The present invention relates to data transmission between electronic devices, and more particularly, to a method for performing serial transport communication, and to an associated device.

A conventional portable electronic device such as a mobile phone (e.g. a multifunctional mobile phone) or a personal digital assistant (PDA) is typically designed to have multiple wireless communication functions respectively complying with different wireless communication standards. For example, the wireless communication functions may comprise a Bluetooth (BT) function, a wireless fidelity (Wi-Fi) function, and a frequency modulation (FM) function. According to the related art, some problems regarding the implementation of the wireless communication functions within the conventional portable electronic device may occur. More particularly, as multiple drivers and multiple transport buses are required for these wireless communication functions, respectively, design complexity may be a burden since the conventional portable electronic device is supposed to handle different transport buses. Thus, a novel method is required for implementing a portable electronic device equipped with a single transport bus to reduce the design complexity.

SUMMARY

It is therefore an objective of the claimed invention to provide a method for performing serial transport communication, and to provide an associated device, in order to solve the above-mentioned problems.

An exemplary embodiment of a method for performing serial transport communication is provided, where the method is utilized for performing communication between a plurality of devices, each of which provides a user with a plurality of wireless communication functions respectively complying with different wireless communication standards. The method comprises: with regard to a first wireless communication function of the plurality of wireless communication functions, utilizing a serial transport protocol to perform communication between the plurality of devices through a transport bus; and with regard to a second wireless communication function of the plurality of wireless communication functions, utilizing the serial transport protocol to perform communication between the plurality of devices through the transport bus.

An exemplary embodiment of a device for performing serial transport communication is provided, where the device is utilized for performing communication with at least one other device, each of the device and the other device provides a user with a plurality of wireless communication functions respectively complying with different wireless communication standards. The device comprises: a transport bus for data transmission; and a control circuit, coupled to the transport bus. The control circuit is arranged to utilize a serial transport protocol to perform communication between the device and the other device through the transport bus with regard to a first wireless communication function of the plurality of wireless communication functions. In addition, the control circuit is further arranged to utilize the serial transport protocol to perform communication between the device and the other device through the transport bus with regard to a second wireless communication function of the plurality of wireless communication functions.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
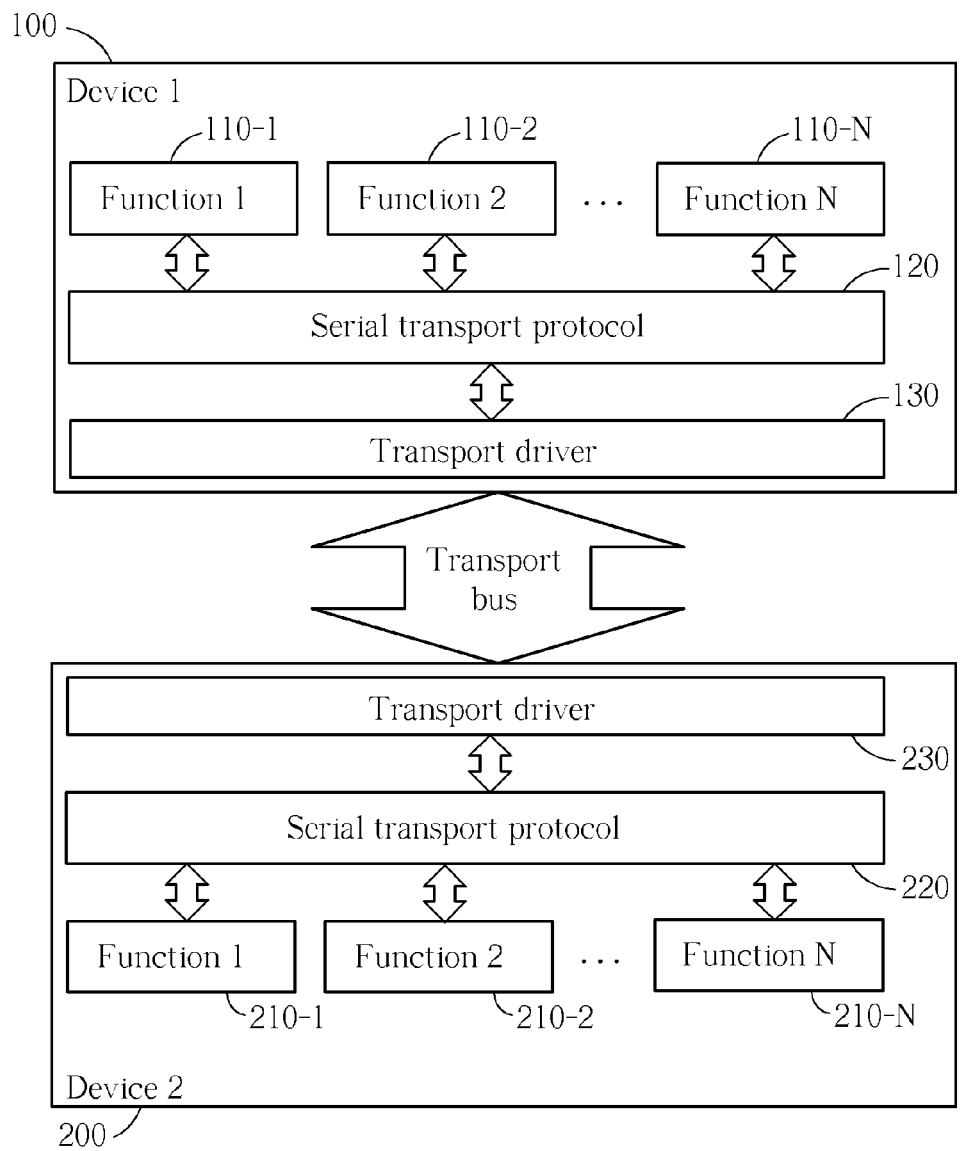
FIG. 1 is a diagram of two devices for performing serial transport communication according to a first embodiment of the present invention.

Please refer to FIG. 1, which illustrates a diagram of two devices 100 and 200 (labeled "Device 1" and "Device 2", respectively) for performing serial transport communication according to a first embodiment of the present invention, where each of the devices 100 and 200 can be utilized for performing communication with at least one other device, such as the other device within the devices 100 and 200. In this embodiment, each of the devices 100 and 200 provides a user with a plurality of wireless communication functions respectively complying with different wireless communication standards. For example, the wireless communication functions may comprise a Bluetooth (BT) function, a wireless fidelity (Wi-Fi) function, and a frequency modulation (FM) function. According to this embodiment, the wireless communication functions 110-1, 110-2, ..., and 110-N of the device 100 are equivalent to the wireless communication functions 210-1, 210-2, ..., and 210-N of the device 200, respectively. Thus, the wireless communication functions 110-1, 110-2, ..., and 110-N are labeled "Function 1", "Function 2", ..., and "Function N" in FIG. 1, respectively, and the wireless communication functions 210-1, 210-2, ..., and 210-N are also labeled "Function 1", "Function 2", ..., and "Function N" in FIG. 1, respectively. As shown in FIG. 1, the device 100 is equipped with a transport driver 130, and is capable of utilizing a serial transport protocol 120 to perform communication corresponding to any of the wireless communication functions 110-1, 110-2, ..., and 110-N through the same transport driver 130. Similarly, the device 200 is equipped with a transport driver 230, and is capable of utilizing a serial transport protocol 220 to perform communication corresponding to any of the wireless communication functions 210-1, 210-2, ..., and 210-N through the same transport driver 230.

Figure 2:
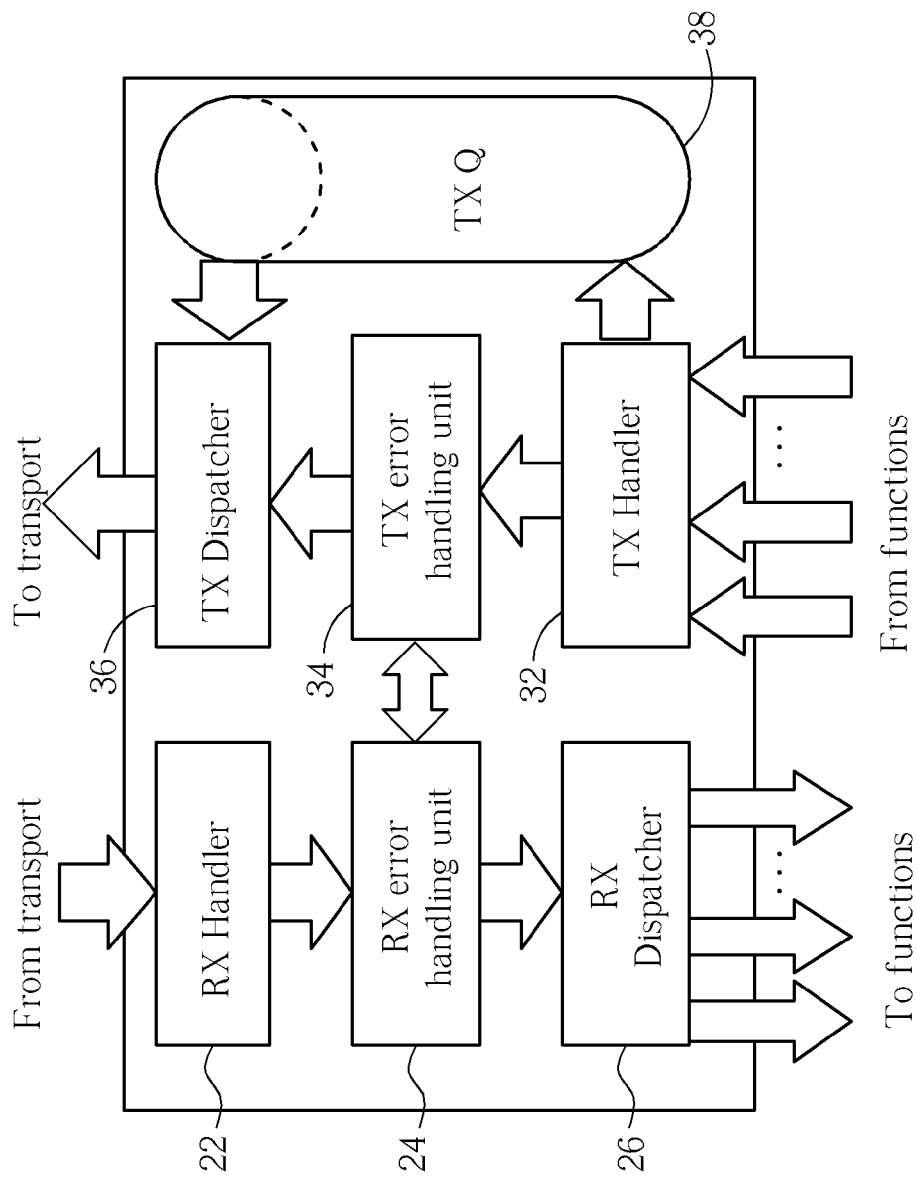
FIG. 2 illustrates a control logic of one of the devices shown in FIG. 1 according to an embodiment of the present invention.

In practice, each of the devices 100 and 200 may comprise at least one portion (e.g. a portion or all) of a transport bus such as that shown in FIG. 1. For example, the devices 100 and 200 shares the same transport bus, where the transport bus is utilized for data transmission, and is the only transport bus between the devices 100 and 200 of this embodiment. In addition, each of the devices 100 and 200 may further comprise a control circuit coupled to the transport bus mentioned above. In general, the control circuit can be referred to as control logic since a portion of the control circuit can be implemented with program code(s). Referring to FIG. 2, an example of the control circuit is illustrated for better comprehension. The control circuit of the device under consideration (e.g. any of the devices 100 and 200) may comprise a receiver (RX) handler 22, an RX error handling unit 24, an RX dispatcher 26, a transmitter (TX) handler 32, a TX error handling unit 34, a TX dispatcher 36, and a TX queue unit 38 (labeled "TX Q" in FIG. 2). In this embodiment, the RX packet paths of the control circuit start from the transport bus (labeled "From transport" in FIG. 2), pass through the RX handler 22, the RX error handling unit 24, and the RX dispatcher 26, and end at the wireless communication functions 110-1, 110-2, ..., and 110-N/210-1, 210-2, ..., and 210-N (labeled "To functions" in FIG. 2). However, the TX packet paths of the control circuit start from the wireless communication functions 110-1, 110-2, ..., and 110-N/210-1, 210-2, ..., and 210-N (labeled "From functions" in FIG. 2), pass through the TX handler 32, the TX queue unit 38, and the TX dispatcher 36, and end at the transport bus (labeled "To transport" in FIG. 2).

According to the embodiment shown in FIG. 2, the RX handler 22 is arranged to receive incoming RX packets from the transport bus, the RX error handling unit 24 is arranged to deal with errors of the incoming RX packets according to the serial transport protocol of the device under consideration (e.g. the serial transport protocol 120 of the device 100, or the serial transport protocol 220 of the device 200), and the RX dispatcher 26 is arranged to dispatch RX packets to the wireless communication functions 110-1, 110-2, ..., and 110-N/ 210-1, 210-2, ..., and 210-N. In addition, the TX handler 32 is arranged to receive incoming TX packets from the wireless communication functions 110-1, 110-2, ..., and 110-N/210-1, 210-2, ..., and 210-N, and the TX queue unit 38 is arranged to temporarily store the incoming TX packets. More particularly, by utilizing the TX queue unit 38, the control circuit controls a plurality of transmitting packets respectively corresponding to the wireless communication functions, such as a portion or all of the incoming TX packets, to queue up for being respectively transmitted to the transport bus, so as to share the transport bus. As a result of implementing the TX queue unit 38, the TX packets do not pass through the TX error handling unit 34. The TX error handling unit 34 is arranged to deal with errors of the incoming TX packets according to the serial transport protocol of the device under consideration (e.g. the serial transport protocol 120 of the device 100, or the serial transport protocol 220 of the device 200), and the TX dispatcher 36 is arranged to dispatch the prepared TX packets to the transport bus. As a result of the arrangement shown in FIG. 2, the TX error handling unit 34 can control dispatching operations of the TX dispatcher 36, and more particularly, can determine whether a TX packet in the TX queue unit 38 should be dispatched to one of the wireless communication functions 110-1, 110-2, ..., and 110-N/210-1, 210-2, ..., and 210-N or not, based upon the serial transport protocol 120/220. Please note that, based upon the serial transport protocol 120/220, the RX error handling unit 24 and the TX error handling unit 34 can interact with each other for purposes of communication control, error correction, and re-transmission.

Figure 3:
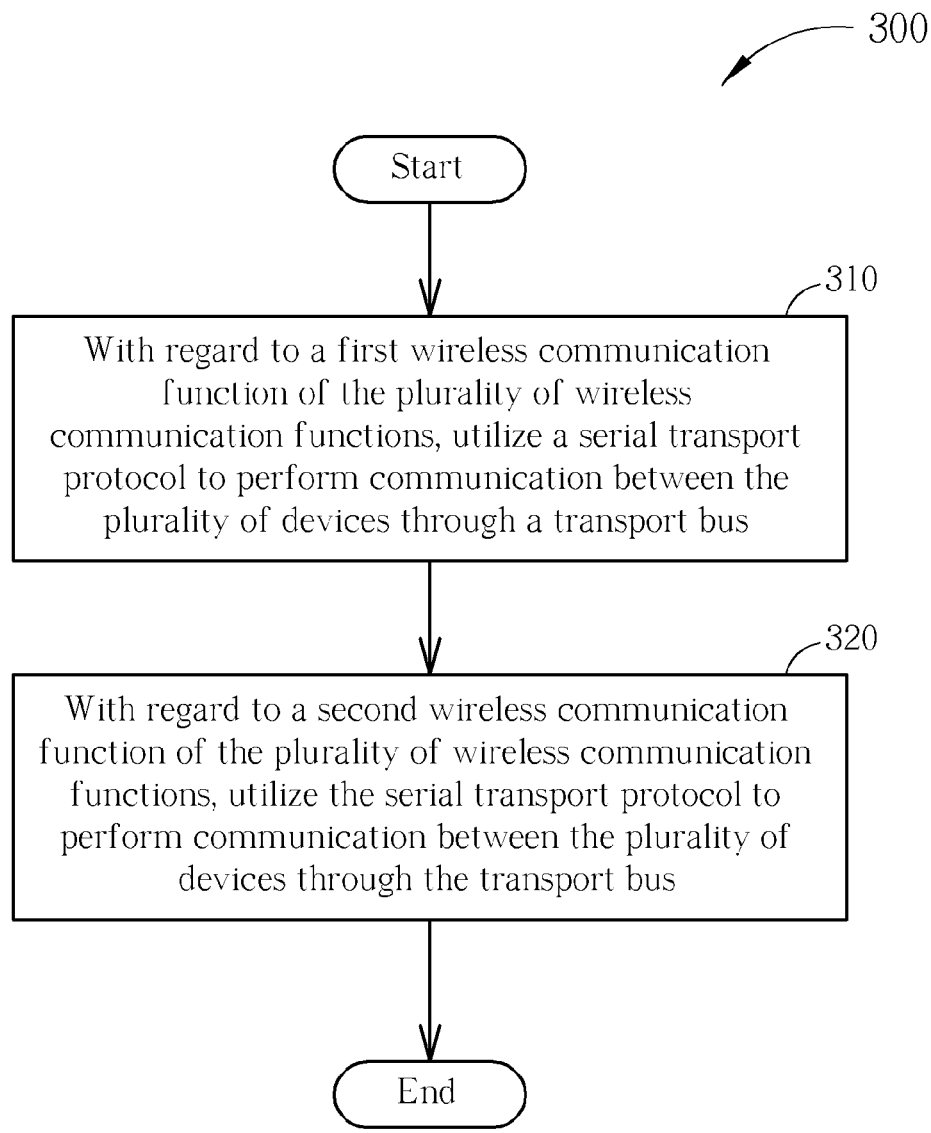
FIG. 3 illustrates a flowchart of a method for performing serial transport communication according to an embodiment of the present invention.

FIG. 3 illustrates a flowchart of a method 300 for performing serial transport communication according to an embodiment of the present invention, where the method 300 is utilized for performing communication between a plurality of devices (e.g. the devices 100 and 200), each of which provides a user with a plurality of wireless communication functions respectively complying with different wireless communication standards, such as the plurality of wireless communication functions mentioned above. The method 300 can be applied to any of the devices 100 and 200 shown in FIG. 1, and more particularly, can be applied to the control circuit of the embodiment shown in FIG. 2. The method 300 is described as follows.

In Step 310, with regard to a first wireless communication function of the plurality of wireless communication functions, the control circuit of the device under consideration (e.g. the control circuit of the device 100/200, such as that shown in FIG. 2) utilizes a serial transport protocol such as the serial transport protocol 120/220 to perform communication between the plurality of devices (e.g. the devices 100 and 200) through a transport bus as shown in FIG. 1. More particularly, with regard to the first wireless communication function, the control logic utilizes a serial transport driver such as the transport driver 130/230 to perform communication between the plurality of devices (e.g. the devices 100 and 200) through the transport bus.

In Step 320, with regard to a second wireless communication function of the plurality of wireless communication functions, the control circuit of the device under consideration (e.g. the control circuit of the device 100/200, as shown in FIG. 2) utilizes the serial transport protocol (more specifically, the same serial transport protocol mentioned in Step 310) to perform communication between the plurality of devices through the transport bus (more specifically, the same transport bus mentioned in Step 310). More particularly, with regard to the second wireless communication function, the control logic utilizes the serial transport driver (more specifically, the same serial transport driver) to perform communication between the plurality of devices (e.g. the devices 100 and 200) through the transport bus.

According to this embodiment, the serial transport driver is arranged to handle packets received from/transmitted to the transport bus. The control circuit can utilize the same serial transport driver to handle these packets, which may be packets corresponding to the wireless communication functions, respectively. In addition, the serial transport protocol mentioned in any of Step 310 and Step 320 is a common protocol for each of the wireless communication functions regarding utilizing the serial transport driver. For example, in a situation where the device under consideration is the device 100, the serial transport protocol 120 is a common protocol for each of the wireless communication functions to utilize the same transport driver 130. In another example, in a situation where the device under consideration is the device 200, the serial transport protocol 220 is a common protocol for each of the wireless communication functions to utilize the same transport driver 230.

Please note that, in a situation where the devices 100 and 200 are the same kind of devices within the same electronic device, the transport driver 230 can be a copy of the transport driver 130. This is for illustrative purposes only, and is not meant to be a limitation of the present invention. In general, it is unnecessary that the devices 100 and 200 are the same kind of devices. For example, the device 100 can be a host chip within the same electronic device, and the device 200 can be a controller chip within the same electronic device. In practice, the serial transport protocol 220 can be a copy of the serial transport protocol 120.

Figure 4:
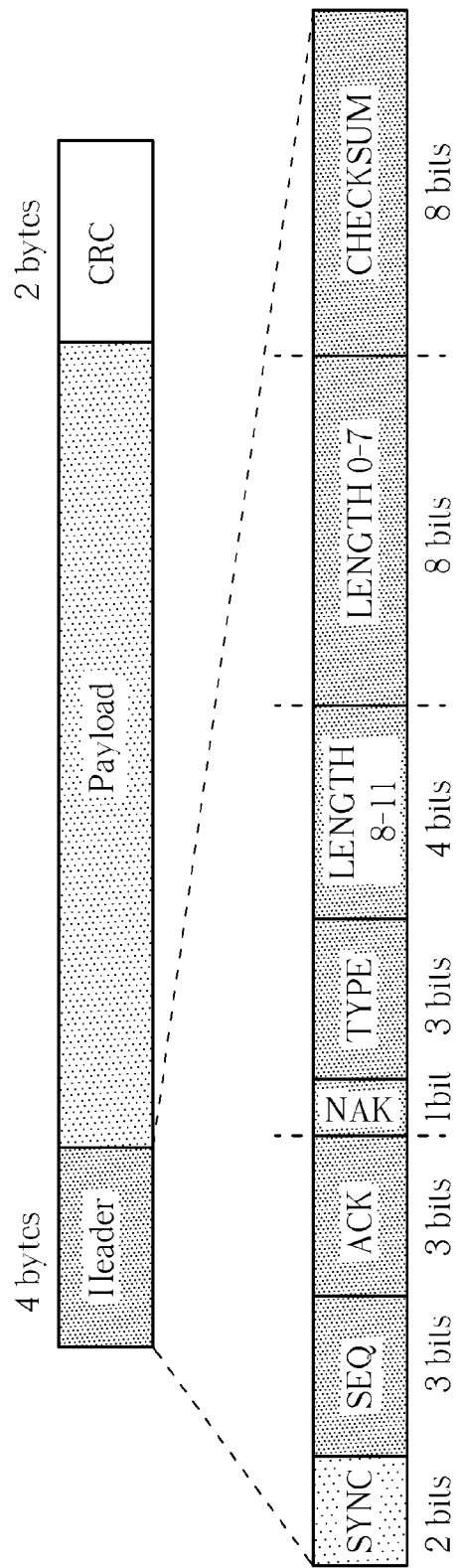
FIG. 4 illustrates a packet format involved with the method shown in FIG. 3 according to an embodiment of the present invention.

FIG. 4 illustrates a packet format involved with the method 300 shown in FIG. 3 according to an embodiment of the present invention. In a packet complying with the serial transport protocol mentioned in Step 310, such as a TX/RX packet within those mentioned in the embodiment shown in FIG. 2, a header is required, and a payload and the corresponding error detection information such as cyclic redundancy check (CRC) information (labeled "CRC" in this embodiment) are optional. For example, the header may comprise 4 bytes, and the payload and the CRC information, if exist, may comprise 99 bytes and 2 bytes, respectively, where the 99 bytes can be data to be transmitted, and the CRC information is generated by performing calculations on the data according to a predetermined CRC rule. According to the packet format shown in FIG. 4, the header can be divided into multiple fields, examples of which may comprise a synchronization (or sync, for brevity) field, a sequence number field, an acknowledgment field, a non-acknowledgment field, a type field, two sub-fields of a length field, and a checksum field (labeled "SYNC", "SEQ", "ACK", "NAK", "TYPE", "LENGTH 8-11", "LENGTH 0-7", and "CHECKSUM" in FIG. 4, respectively), where the sub-field labeled "LENGTH 8-11" represents the $8^{th}$ through to the $11^{th}$ bits of the length field, and the sub-field labeled "LENGTH 0-7" represents the $0^{th}$ through to the $7^{th}$ bits of the length field. In this embodiment, the respective numbers of bits of the sync field, the sequence number field, the acknowledgment field, the non-acknowledgment field, the type field, the two sub-fields of the length field, and the checksum field are 2 bits, 3 bits, 3 bits, 1 bit, 3 bits, 4 bits, 8 bits, and 8 bits.

According to this embodiment, the sequence number in the sequence number field is cyclic, and may vary from 0 to 7. The value of the acknowledgment field is typically set as a value that is set in the sequence number field of a previously received packet, i.e. the sequence number of the previously received packet. As a result, the value of the acknowledgment field of this embodiment may also vary from 0 to 7. In addition, a value 0 set in the non-acknowledgment field represents that there is no error, and a value 1 set in the non-acknowledgment field represents that an error occurs, and more particularly, represents that an erroneous packet is detected.

Regarding the type field, the value therein may vary to indicate that the packet comprising this header is one of a plurality of types of packets, such as a BT Host Controller Interface (HCI) packet, an FM packet, a Global Positioning System (GPS) packet, or a Wi-Fi packet. Thus, this field typically corresponds to one of the wireless communication functions mentioned above. Additionally, in a situation where the value of the length field is 0, the packet comprising this header is a header-only packet, which means there is no payload in this packet (and therefore, the corresponding error detection information mentioned above is not required in this packet). An exemplary value of the checksum field can be ((Byte[0]+Byte[1]+Byte[2]) & 0xFF), where (Byte[0]+Byte[1]+Byte[2]) represents the first three bytes of this header comprising the sync field through to the length field.

Figure 5:
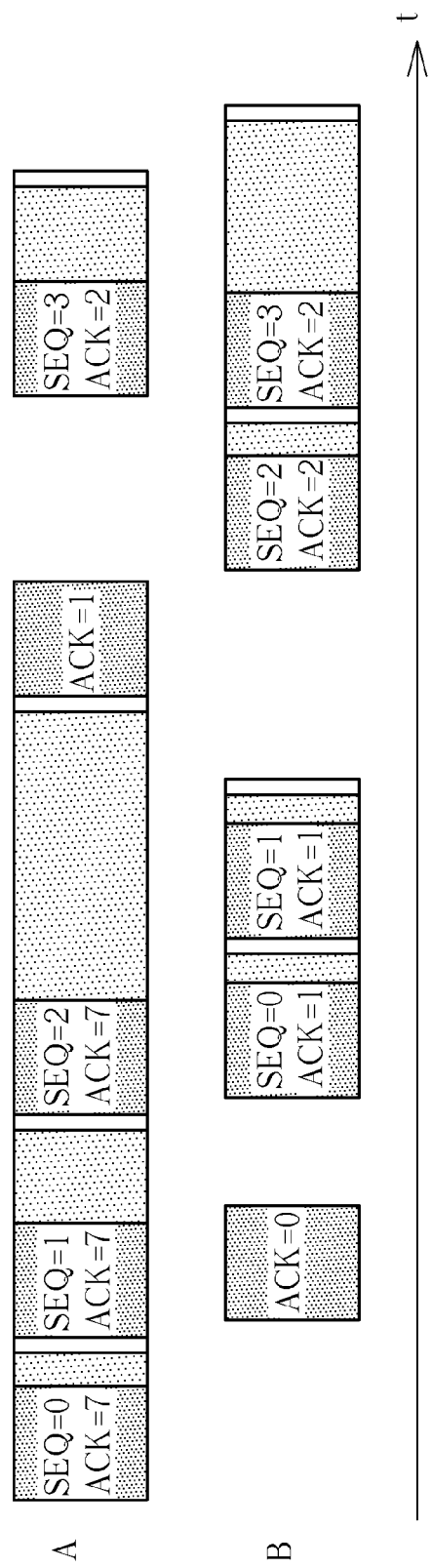
FIG. 5 illustrates a sequence-number/acknowledgement scheme involved with the method shown in FIG. 3 according to an embodiment of the present invention.

FIG. 5 illustrates a sequence-number/acknowledgement scheme involved with the method 300 shown in FIG. 3 according to an embodiment of the present invention, where the horizontal axis t shown in FIG. 5 represents the time axis, and different levels of shading that are utilized for distinguishing one from others within the header, the payload, and the CRC information shown in FIG. 4 are also utilized for illustrating the header, the payload, and/or the CRC information of some packets of this embodiment.

The sequence-number/acknowledgement scheme is utilized for ensuring that a packet has been received by a peer device. In a situation where the device under consideration is the device 100, the peer device can be the device 200. In a situation where the device under consideration is the device 200, the peer device can be the device 100. For better comprehension, within the plurality of devices such as the devices 100 and 200, the notation "A" can be utilized for representing the device 100, and the notation "B" can be utilized for representing the device 200. In addition, the notation CTRL-CKT-A can be utilized for representing the control logic of the device A (i.e. the device 100), and the notation CTRL-CKT-B can be utilized for representing the control logic of the device B (i.e. the device 200).

In this embodiment, the serial transport protocol 220 is a copy of the serial transport protocol 120, and therefore, the numeral 20 can be utilized for collectively representing the serial transport protocol 120 and the serial transport protocol 220, for brevity. Based upon the serial transport protocol 20, the control logic CTRLCKT-A typically sets the sequence number field SEQ of a first packet of a plurality of first packets sent from the device A, for distinguishing the first packet from others within the first packets. For example, the sequence numbers in the sequence number field SEQ of the first packets are cyclic. As shown in the upper half of FIG. 5, the sequence numbers in the respective headers of some of the first packets are 0, 1, 2, 3, . . . (labeled "SEQ=0", "SEQ=1", "SEQ=2", "SEQ=3", . . . in the headers of the first row of packets), respectively. Thus, the sequence formed with the sequence numbers of the first packets can be {{0, 1, 2, 3, 4, 5, 6, 7}, {0, 1, 2, 3, 4, 5, 6, 7}, . . . }.

Based upon the serial transport protocol 20, the control logic CTRLCKT-B typically sets the acknowledgment field ACK of a second packet sent from the device B to the device A, so as to notify the device A that the first packet is received and acknowledged by the device B. More particularly, based upon the serial transport protocol 20, the control logic CTRLCKT-B sets the acknowledgment field ACK of the second packet as a value that is set in the sequence number field of the first packet. As shown in the lower half of FIG. 5, the values of the acknowledgment field ACK in the respective headers of some of the second packets sent from the device B to the device A are 0, 1, 1, 2, 2, . . . (labeled "ACK=0", "ACK=1", "ACK=1", "ACK=2", "ACK=2", . . . in the headers of the second row of packets), respectively. Please note that packet transmission and packet processing may cause delay of packet acknowledgment. As a result, at the moment when the control logic CTRLCKT-B sets the acknowledgment field ACK of the second packet, the first packet that the device B (more particularly, the control logic CTRLCKT-B) is going to acknowledge (or is acknowledging) may be a previous first packet sent from the device A, rather than the latest first packet that is just sent from the device A. This explains the reason why the leftmost second packet shown in FIG. 5 (i.e. the one having no payload within the second row of packets) is labeled "ACK=0", rather than being labeled "ACK=1", where the leftmost second packet shown in FIG. 5 notifies the device A that the leftmost first packet shown in FIG. 5 (i.e. the one whose header is labeled "SEQ=0" within the first row of packets) is received and acknowledged by the device B.

According to this embodiment, the acknowledgment field of some continuously transmitted second packets may have the same value since there is no new first packet that has been acknowledged at the moment when the acknowledgment field of the last one of these continuously transmitted second packets is set. For example, at the moment when the acknowledgment field of the central second packet shown in FIG. 5 (i.e. the one whose header is labeled "SEQ=1" and "ACK=1" within the second row of packets) is set, the first packet whose sequence number is 1 has been acknowledged while acknowledgment of the first packet whose sequence number is 2 may be delayed due to packet transmission and packet processing.

For the device A, there may be a tolerance regarding the number of unacknowledged packets within the first packets, so that the performance of packet transmission will not be hindered. For example, the control logic CTRLCKT-A counts the number of unacknowledged packets within the first packets. When the number of the unacknowledged packets reaches a predetermined threshold value, the control logic CTRLCKT-A controls the device A to temporarily stop sending any packet carrying a payload. That is, in a situation where the number of the unacknowledged packets within the first packets does not reach the predetermined threshold, the control logic CTRLCKT-A may tolerate the existence of the unacknowledged packets. In practice, the predetermined threshold value is less than the total number of all sequence numbers available for being set in the sequence number field, allowing a margin of transmission delay. In this embodiment, as the sequence number in the sequence number field is cyclic and may vary from 0 to 7, the total number of all sequence numbers available for being set in the sequence number field is equal to 8, and the predetermined threshold value can be 7, which is less than 8.

As disclosed above, the payload and the corresponding error detection information such as the CRC information (labeled "CRC" in the embodiment shown in FIG. 4) are optional. According to this embodiment, within the first packets sent from the device A, the control logic CTRLCKT-B typically acknowledges those respectively having payloads, rather than those having no payload. That is, the first packet mentioned above is a packet carrying a payload, and based upon the serial transport protocol 20, the control logic CTRLCKT-B prevents the device B from acknowledging any first packet that does not carry a payload.

According to this embodiment, the operations that the control logic CTRLCKT-A performs with respect to the device B can be applied to the control logic CTRLCKT-B when applicable. Similarly, the operations that the control logic CTRLCKT-B performs with respect to the device A can be applied to the control logic CTRLCKT-A when applicable. For brevity, similar descriptions are not repeated in detail.

Figure 6:
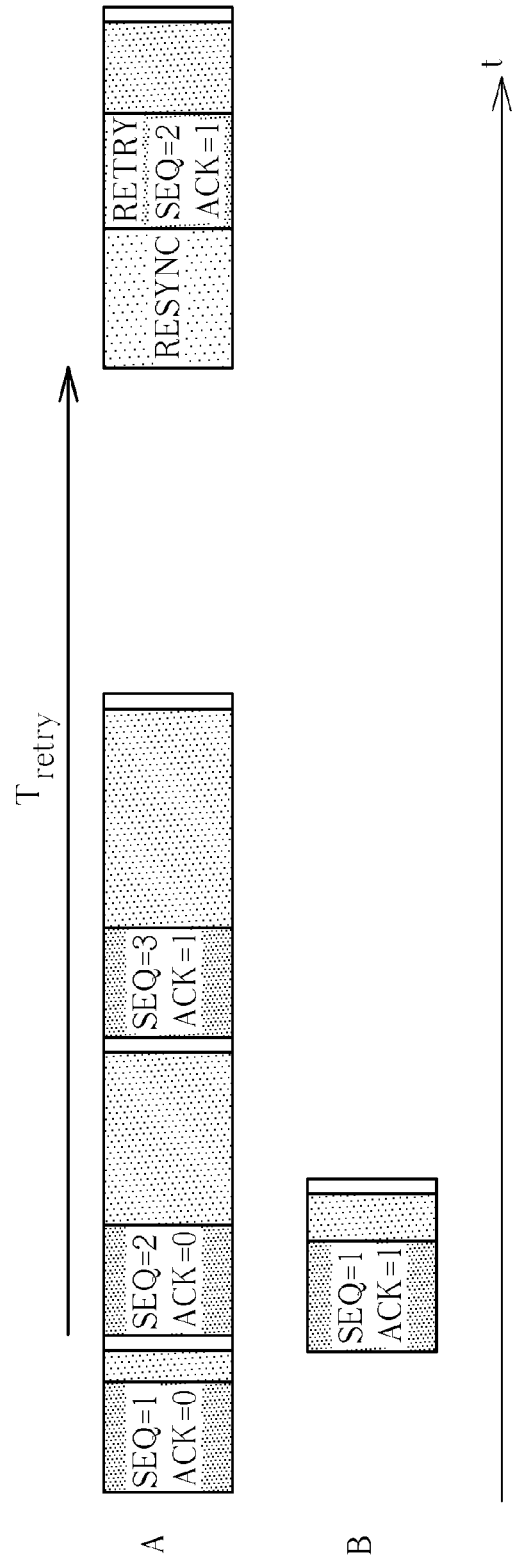
FIG. 6 illustrates a timeout/retransmission scheme involved with the method shown in FIG. 3 according to an embodiment of the present invention.

FIG. 6 illustrates a timeout/retransmission scheme involved with the method 300 shown in FIG. 3 according to an embodiment of the present invention, where the sequence-number/acknowledgement scheme shown in FIG. 5 and the associated operations of the control logic CTRLCKT-A and CTRLCKT-B can be applied to this embodiment.

According to this embodiment, the control logic CTRLCKT-A can trigger a retry timer to start measuring a time interval T6 since the first packet mentioned above is sent. For example, the first packet under consideration can be the packet next to the leftmost first packet shown in FIG. 6 (i.e. the first packet whose header is labeled "SEQ=2" and "ACK=0" within the first row of packets). The control logic CTRLCKT-A detects whether any acknowledging packet for acknowledging the first packet under consideration (e.g. any second that acknowledges the first packet under consideration) is received. In a situation where no acknowledging packet for acknowledging the first packet under consideration is received (e.g. no second packet whose acknowledgment field ACK is set as 2 is received), when the retry timer expires (e.g. the time interval T6 reaches a predetermined threshold $T_{retry}$), the control logic CTRLCKT-A controls the device A to re-send any first packet that is not acknowledged, such as the two first packets that are sent during the time interval (i.e. the two illustrated around the center within the first row of packets).

In particular, the control logic CTRLCKT-A starts the re-sending operation(s) by sending a re-sync pattern RESYNC first, where the control logic CTRLCKT-B typically monitors whether the re-sync pattern RESYNC exists in the incoming packets in order to recognize this situation. For example, the re-sync pattern RESYNC may comprise 4 bytes {0x7F, 0x7F, 0x7F, 0x7F}. As shown in FIG. 6, the re-sent first packet next to the re-sync pattern RESYNC is a retried version (labeled "RETRY", on the header) of the first packet whose header is labeled "SEQ=2" and "ACK=0" within the first row of packets, where the header of the retried version is re-labeled "ACK=1" for illustrating the fact that the second packet whose header is labeled "SEQ=1" and "ACK=1" in the second row shown in FIG. 6 has been acknowledged by the device A.

Please note that the operations that the control logic CTRLCKT-A performs with respect to the device B can be applied to the control logic CTRLCKT-B when applicable, and the operations that the control logic CTRLCKT-B performs with respect to the device A can be applied to the control logic CTRLCKT-A when applicable. For brevity, similar descriptions are not repeated in detail.

Figure 7:
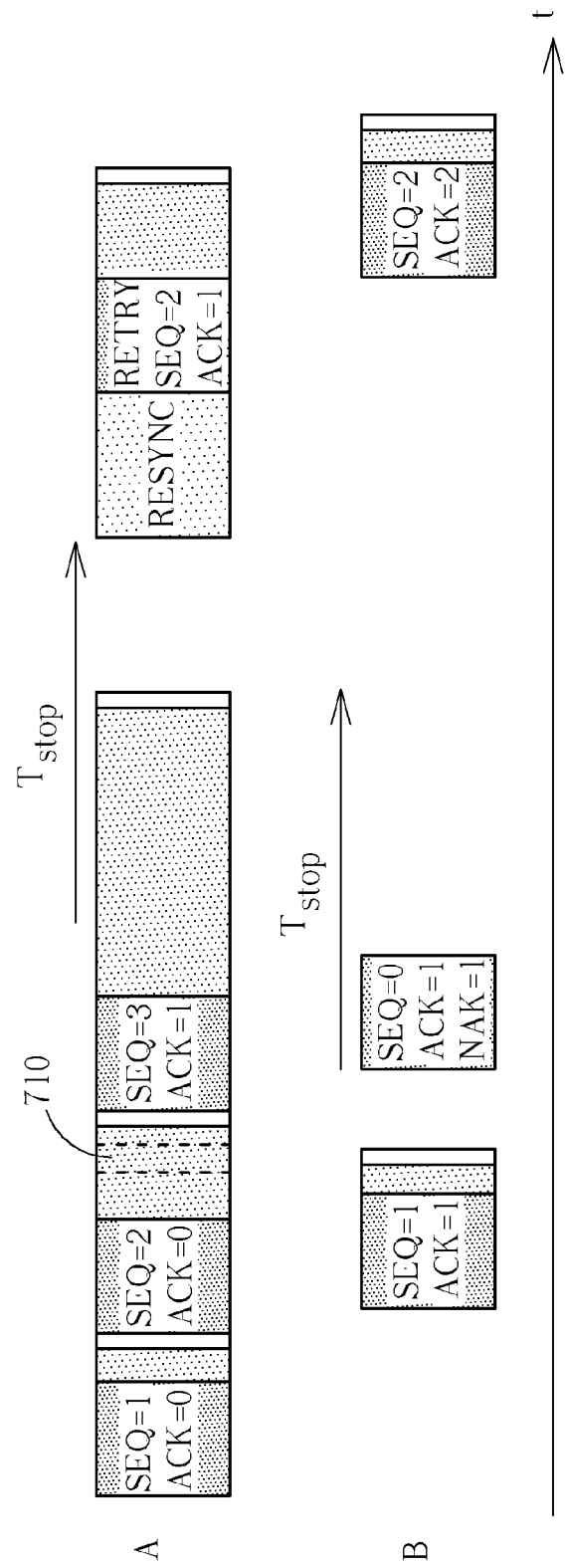
FIG. 7 illustrates a non-acknowledgement/retransmission scheme involved with the method shown in FIG. 3 according to an embodiment of the present invention.

FIG. 7 illustrates a non-acknowledgement/retransmission scheme involved with the method 300 shown in FIG. 3 according to an embodiment of the present invention, where the sequence-number/acknowledgement scheme shown in FIG. 5 and the associated operations of the control logic CTRLCKT-A and CTRLCKT-B can be applied to this embodiment.

According to this embodiment, based upon the serial transport protocol 20, the control logic CTRLCKT-B can set the non-acknowledgment field NAK of a second packet sent from the device B to the device A, so as to notify the device A that an error is detected. That is, when it is detected that an error occurs, the control logic CTRLCKT-B sends the second packet whose non-acknowledgment field NAK is set as 1 to the device A. For example, the second packet under consideration can be the second packet labeled "SEQ=0", "ACK=1" and "NAK=1" (i.e. the one having no payload within the second row of packets shown in FIG. 7), where this second packet is utilized for notifying the device A that an error is detected. As the non-acknowledgment field NAK of this second packet is set as 1, the sequence number field SEQ becomes in a status of "Don't care" and can be arbitrary.

As shown in FIG. 7, the control logic CTRLCKT-B triggers a stop timer to start measuring a time interval T7 since the second packet under consideration is sent, and controls the device B to drop any first packet until the stop timer expires (e.g. the time interval T7 reaches a predetermined threshold $T_{stop}$). For example, in a situation where a portion 710 of the payload of the first packet whose header is labeled "SEQ=2" and "ACK=0" is erroneous (e.g. the portion 710 is originally incorrect, or the portion 710 is distorted during packet transmission), the control logic CTRLCKT-B drops the first packet carrying the portion 710 and further drops the next first packet. After the time interval T7 reaches the predetermined threshold $T_{stop}$, the control logic CTRLCKT-B monitors whether any re-sync pattern RESYNC exists in the incoming packets in order to receive re-sent packet(s).

For the device A, when the second packet under consideration is received and it is detected that non-acknowledgment field NAK of the second packet under consideration is set as 1, the control logic CTRLCKT-A waits for a period that is equivalent to the predetermined threshold $T_{stop}$, and then starts the re-sending operation(s) by sending the re-sync pattern RESYNC first. For example, the re-sync pattern RESYNC may comprise 4 bytes {0x7F, 0x7F, 0x7F, 0x7F}. As shown in FIG. 7, the re-sent first packet next to the re-sync pattern RESYNC is a retried version (labeled "RETRY", on the header) of the first packet whose header is labeled "SEQ=2" and "ACK=0" within the first row of packets, where the header of the retried version is re-labeled "ACK=1" for illustrating the fact that the second packet whose header is labeled "SEQ=1" and "ACK=1" in the second row shown in FIG. 7 has been acknowledged by the device A.

Please note that the operations that the control logic CTRLCKT-A performs with respect to the device B can be applied to the control logic CTRLCKT-B when applicable, and the operations that the control logic CTRLCKT-B performs with respect to the device A can be applied to the control logic CTRLCKT-A when applicable. For brevity, similar descriptions are not repeated in detail.

Figure 8:
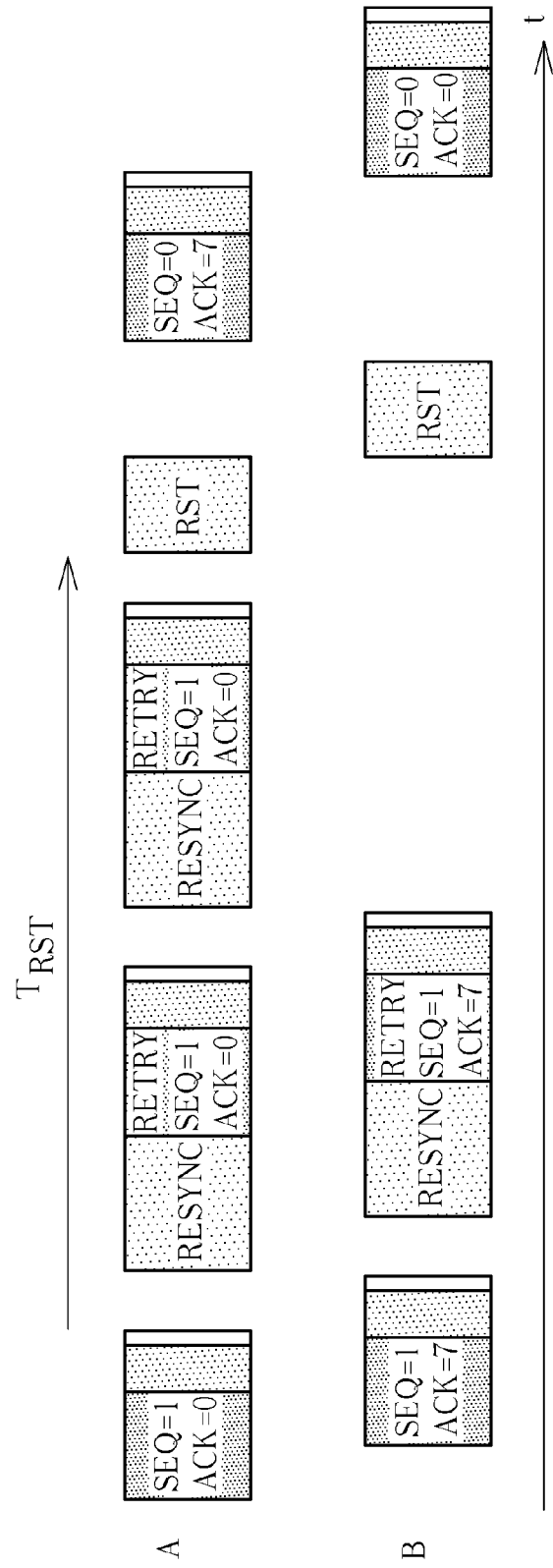
FIG. 8 illustrates a reset scheme involved with the method shown in FIG. 3 according to an embodiment of the present invention.

FIG. 8 illustrates a reset scheme involved with the method 300 shown in FIG. 3 according to an embodiment of the present invention, where the sequence-number/acknowledgement scheme shown in FIG. 5 and the associated operations of the control logic CTRLCKT-A and CTRLCKT-B can be applied to this embodiment.

According to this embodiment, based upon the serial transport protocol 20, the control logic CTRLCKT-A can recover transmission between the device A and the device B by performing re-transmission based upon the embodiments respectively shown in FIG. 5 and FIG. 6. When it is detected that recovering the transmission between the device A and the device B is unsuccessful, the control logic CTRLCKT-A controls the device A to send a reset pattern RST to notifying the device B that resetting the transmission between the device A and the device B is required.

In practice, the control logic CTRLCKT-A can trigger a reset timer to start measuring a time interval T8 since the beginning of recovering the transmission between the device A and the device B. In a situation where recovering the transmission between the device A and the device B is unsuccessful, when the reset timer expires (e.g. the time interval T8 reaches a predetermined threshold $T_{RST}$), the control logic CTRLCKT-A controls the device A to send the reset pattern RST to notifying the device B that resetting the transmission between the device A and the device B is required. When receiving the reset pattern RST sent from the device A, the control logic CTRLCKT-B controls the device B to send another reset pattern RST to notifying the device A that the reset pattern RST sent from the device A is received. As a result, both of the devices A and B reset the transmission between the device A and the device B.

Please note that the operations that the control logic CTRLCKT-A performs with respect to the device B can be applied to the control logic CTRLCKT-B when applicable, and the operations that the control logic CTRLCKT-B performs with respect to the device A can be applied to the control logic CTRLCKT-A when applicable. For brevity, similar descriptions are not repeated in detail.

It is an advantage of the present invention that the present invention method and device provide compact architecture for serial transport communication. As a result of utilizing the serial transport protocol, the design complexity can greatly be reduced. In addition, based upon the serial transport protocol, the control overhead can be decreased, so the transmission bandwidth can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing serial transport communication, the method being utilized for performing communication between a plurality of devices, each of which provides a user with a plurality of wireless communication functions respectively complying with different wireless communication standards, the method comprising:
   with regard to a first wireless communication function of the plurality of wireless communication functions, utilizing a serial transport protocol to perform communication between the plurality of devices through a transport bus;
   with regard to a second wireless communication function of the plurality of wireless communication functions, utilizing the serial transport protocol to perform communication between the plurality of devices through the transport bus;
   with regard to the first wireless communication function, utilizing a serial transport driver to perform communication between the plurality of devices through the transport bus; and
   with regard to the second wireless communication function, utilizing the serial transport driver to perform communication between the plurality of devices through the transport bus;
   wherein the serial transport driver is arranged to handle data received from/transmitted to the transport bus, and the serial transport protocol is a common protocol for each of the wireless communication functions regarding utilizing the serial transport driver.

2. The method of claim 1, further comprising:
   controlling a plurality of transmitting packets respectively corresponding to the wireless communication functions to queue up for being respectively transmitted to the transport bus, so as to share the transport bus.

3. The method of claim 1, further comprising:
   based upon the serial transport protocol, setting a sequence number field of a first packet of a plurality of first packets sent from a first device of the plurality of devices, for distinguishing the first packet from others within the first packets.

4. The method of claim 3, further comprising:

based upon the serial transport protocol, setting an acknowledgment field of a second packet sent from a second device of the plurality of devices to the first device, so as to notify the first device that the first packet is received and acknowledged by the second device.

5. The method of claim 4, further comprising:

counting a number of unacknowledged packets within the first packets; and when the number of the unacknowledged packets reaches a predetermined threshold value, controlling the first device to temporarily stop sending any packet carrying a payload.

6. The method of claim 5, wherein based upon the serial transport protocol, respective sequence numbers in the sequence number field of the first packets are cyclic; and the predetermined threshold value is less than a total number of all sequence numbers available for being set in the sequence number field, allowing a margin of transmission delay.

7. The method of claim 4, wherein the step of setting the acknowledgment field further comprises:

based upon the serial transport protocol, setting the acknowledgment field of the second packet as a value that is set in the sequence number field of the first packet.

8. The method of claim 4, wherein the first packet is a packet carrying a payload; and the method further comprises:

based upon the serial transport protocol, preventing the second device from acknowledging any first packet that does not carry a payload.

9. The method of claim 3, further comprising:

triggering a retry timer to start measuring a time interval since the first packet is sent;

detecting whether any acknowledging packet for acknowledging the first packet is received; and in a situation where no acknowledging packet for acknowledging the first packet is received, when the retry timer expires, controlling the first device to re-send any first packet that is not acknowledged.

10. The method of claim 3, further comprising:

based upon the serial transport protocol, setting a non-acknowledgment field of a second packet sent from a second device of the plurality of devices to the first device, so as to notify the first device that an error is detected; and triggering a stop timer to start measuring a time interval since the second packet is sent, and controlling the second device to drop any first packet until the stop timer expires.

11. The method of claim 3, further comprising:

based upon the serial transport protocol, recovering transmission between the first device and a second device of the plurality of devices by performing re-transmission; and when it is detected that recovering the transmission between the first device and the second device is unsuccessful, controlling the first device to send a reset pattern to notifying the second device that resetting the transmission between the first device and the second device is required.

12. A device for performing serial transport communication, the device being utilized for performing communication with at least one other device, each of the device and the other device provides a user with a plurality of wireless communication functions respectively complying with different wireless communication standards, the device comprising:

a transport bus for data transmission; and a control circuit, coupled to the transport bus, arranged to utilize a serial transport protocol to perform communication between the device and the other device through the transport bus with regard to a first wireless communication function of the plurality of wireless communication functions, and further arranged to utilize the serial transport protocol to perform communication between the device and the other device through the transport bus with regard to a second wireless communication function of the plurality of wireless communication functions, wherein with regard to the first wireless communication function, the control circuit utilizes a serial transport driver to perform communication between the device and the other device through the transport bus, and with regard to the second wireless communication function, the control circuit utilizes the serial transport driver to perform communication between the device and the other device through the transport bus;

wherein the serial transport driver is arranged to handle data received from/transmitted to the transport bus, and the serial transport protocol is a common protocol for each of the wireless communication functions regarding utilizing the serial transport driver.

13. The device of claim 12, wherein the control circuit controls a plurality of transmitting packets respectively corresponding to the wireless communication functions to queue up for being respectively transmitted to the transport bus, so as to share the transport bus.

* * * * *